United States Patent
Gelman et al.

(10) Patent No.: US 10,282,570 B2
(45) Date of Patent: May 7, 2019

(54) STANDARD CARD READER FOR MOBILE APPLICATION

(71) Applicant: Hirschmann Car Communication GmbH, Neckartenzlingen (DE)

(72) Inventors: Alexander Gelman, Fellbach (DE); David Silva, Nuertingen (DE)

(73) Assignee: HIRSCHMANN CAR COMMUNICATION GMBH, Neckartenzlingen (DE)

(*) Notice: Subject to any disclaimer, the term of this patent is extended or adjusted under 35 U.S.C. 154(b) by 0 days.

(21) Appl. No.: 15/516,126

(22) PCT Filed: Dec. 2, 2015

(86) PCT No.: PCT/EP2015/078358
§ 371 (c)(1),
(2) Date: May 24, 2017

(87) PCT Pub. No.: WO2016/087513
PCT Pub. Date: Jun. 9, 2016

(65) Prior Publication Data
US 2017/0262665 A1 Sep. 14, 2017

(30) Foreign Application Priority Data
Dec. 2, 2014 (DE) ........................ 10 2014 224 573

(51) Int. Cl.
*G06K 7/00* (2006.01)
*G06K 13/08* (2006.01)

(52) U.S. Cl.
CPC ........... *G06K 7/006* (2013.01); *G06K 13/085* (2013.01)

(58) Field of Classification Search
CPC .............................. G06K 13/08; G06K 7/0021
USPC ........................................ 235/451, 454, 486
See application file for complete search history.

(56) References Cited

U.S. PATENT DOCUMENTS

| 6,561,431 B2 | 5/2003 | Roussy |
| 8,056,813 B2 | 11/2011 | Long |
| 8,657,202 B2 | 2/2014 | Watanabe |
| 2001/0032882 A1* | 10/2001 | Roussy ................ G06K 7/0021 235/451 |
| 2004/0057055 A1 | 3/2004 | Isshiki et al. |
| 2007/0057055 A1 | 3/2007 | Horng |

FOREIGN PATENT DOCUMENTS

| DE | 3518247 A | 11/1986 |
| WO | 2014135514 A | 9/2014 |

* cited by examiner

*Primary Examiner* — Jamara A Franklin
(74) *Attorney, Agent, or Firm* — Andrew Wilford

(57) ABSTRACT

The invention relates to a card-reading device (1), comprising a housing (2) of a card retainer (4), into which a card (5) can be inserted, and locking means (6) which prevent the card (5) from moving out of the card retainer (4) when the card (5) is inserted.

6 Claims, 3 Drawing Sheets

STANDARD CARD READER FOR MOBILE APPLICATION

CROSS REFERENCE TO RELATED APPLICATIONS

Figure 1:
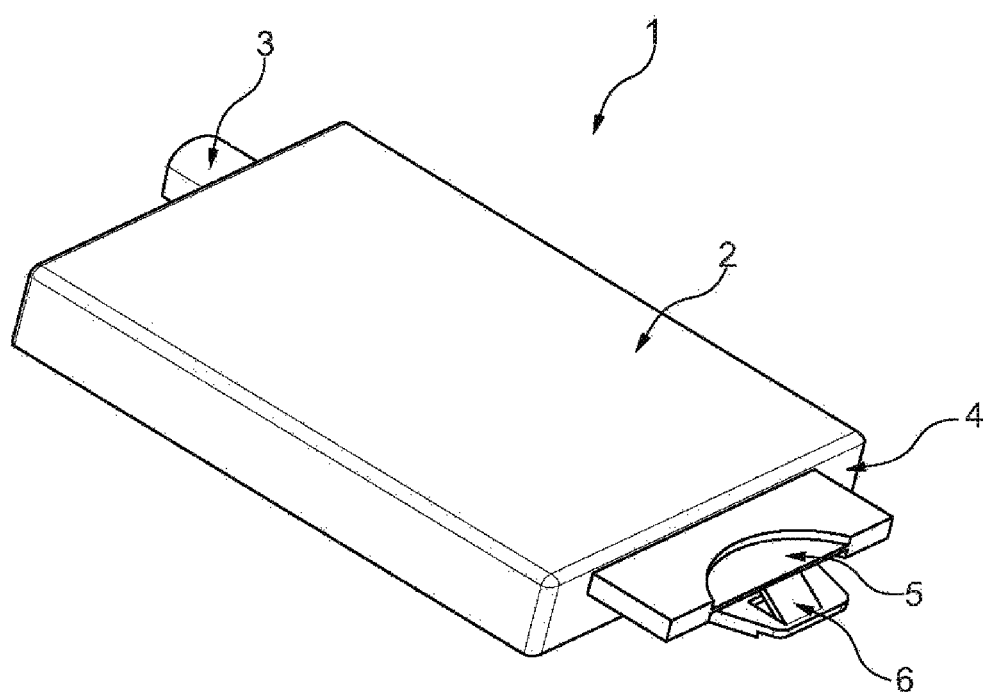

This application is the US-national stage of PCT application PCT/EP2015/078358 filed 2 Dec. 2015 and claiming the priority of German patent application 102014224573.7 itself filed 2 Dec. 2014.

The invention relates to a card reader having a housing of a card holder into which a card can be fitted according to the features of the preamble of patent claim 1.

Cards in bank-card format, for example, are required for receiving, processing, in particular decoding, and playing back signals (that are for example received over antennas or supplied via cables); the user can verify authorization for receiving the signal with such cards.

Typically such cards are used for pay TV services. Signals with programs that are encrypted, for example, are supplied to a television set or a decoder by way of antennas or cables. The encryption cannot be overcome until the user inserts a card into a card reader, for example, and the signal is decrypted in the card reader, for which purpose appropriate means are made available. When the signal has been decrypted, the desired program cannot only be received but can also be played back.

Card readers having a housing for a card holder into which a card can be fitted are known for this purpose. An "intelligence" is incorporated into the housing and is used for decryption and playback of the encrypted signals supplied to it. This decryption functions properly only when a card has been fitted into the housing of the card reader. To do so, this card is easily fitted into a card holder of the card reader. The card is secured in the card holder in the card reader only by contact points on the card and corresponding contact points in the housing of the card reader. This means that such card readers are usually designed for stationary consumer applications. Since the card readers are placed in fixed, i.e. stationary, locations, the components are not exposed to vibrations. These known card readers comprise a housing with a card holder (for example, a slot) into which a card can be fitted and they are also available in large numbers, so these card readers are very inexpensive. However, since no measures are provided for securing the card in the card holder in the card reader, such card readers cannot be used for mobile applications where vibration is particularly common.

Therefore, the object of the present invention is to provide a card reader that is suitable and designed for mobile use, in particular for use in a vehicle.

This object is achieved by the features of patent claim 1.

According to the invention, the housing for the card reader has means for retaining a card holder, the card being fittable into the card holder and, in addition, a latch is provided to prevent the card from coming out of the card holder after being fitted into it. The invention exploits the idea that a conventional card reader that has a housing for a card holder into which a card can be fitted and that is known from the consumer field and is available inexpensively and in large numbers, may be used for mobile applications, in particular for use in vehicles. This is made possible by the fact that the housing with the card holder is used to receive the card in another housing (enclosure). Furthermore, not only is it used there and the card contacted accordingly, but also, due to the latch, the card is held immovably in the housing of the card reader and secured there, so that interfering influences due to the mobile applications, such as vibration, temperature fluctuations and the like, for example, no longer have any effect on the retention of the card in the card reader and also have no effect on the electrical contacting.

In a further embodiment of the invention, the means for accommodating the card holder for retaining the card inside the housing of the card reader are designed as guides. Therefore, after the card has been fitted into the card holder, the card holder is fitted into the housing of the card reader in a targeted and guided manner. This is a simple and secure operation, so that the latch can be effective when the card holder has been fitted into its ideal position in the housing of the card reader by the guides. Once the ideal position has been reached, the latch is operative and secures the card and/or the card holder in the housing of the card reader.

In a further embodiment of the invention, the latch has a first latch formation that cooperates with the card holder and a second latch formation that cooperates with the card. When the card is in its ideal position in the card holder and the card holder is also in its ideal position in the housing of the card reader, then the card holder together with the card is secured in the housing of the card reader by the first latch formation while at the same time or after a time lag the second latch formation secures the card in the card holder. It is therefore also advantageously possible to quickly replace the card alone and/or the card fitted into the card holder with another card or replace one card holder with another card holder together, with the card in the card reader, but instead both the card reader and the card are secured reliably in the housing of the card reader by these two lock formations.

The card reader with its housing is basically mounted in a stationary position in a vehicle, for example, for receiving the card holder and/or for receiving a card when the card holder is already fitted into the housing. The card holder can be fitted into the card reader that is arranged in a stationary position in the vehicle and can be locked by the first latch formation, so that, in this constellation, it is readily possible to insert the card into the card holder and to lock it using the second latch formation and, if desired, to replace it with another card. Alternatively, it is possible for the first card holder to be fitted with a first card into the card reader and locked there, such that, after insertion into the card reader, this first card holder with the first card can be replaced easily by a second card holder with another card and can be fitted into the correct position there permanently by means of the two lock formations.

In a further embodiment of the invention, the latch is designed as locking hooks which permits a structurally simple option that is easy to make and is simple from the standpoint of manufacturing technology for implementation of the latch. Furthermore, locking hooks are especially easy to operate for changing the card and/or switching the card holder.

In a further embodiment of the invention, the latch is formed either by the housing, so that the housing and the latch form a one-piece component, or the housing and the latch form parts that can be produced separately from one another, and the latch can be mounted on the housing after its manufacture. This can be accomplished, for example, by locking, clipping, screwing, gluing, riveting or the like. With regard to the use of these parts in vehicles and also with regard to their permanent stability and operability, the elements involved (the housing of the card reader, the latch) are made of plastic.

In a further embodiment of the invention, the latch and at least partially the housing are designed as one-piece injection molded parts made of plastic. This has the advantage that the housing of the card reader can be manufacture quickly and inexpensively together with the latch. The design of the housing as a two-part housing is particularly advantageous (for example, an upper shell and a lower shell, preferably identical), and the locking elements are mounted on one part of the housing. The card reader is therefore easily assembled by manufacturing the bottom part of the housing together with the latch, preferably in a plastic injection molding process, then using the hardware (a circuit board with electronic components and contacts and connectors) and the guides, and finally, closing the housing with the upper shell.

To illustrate the invention, a card reader according to the invention is described below and illustrated on the basis of the figures.

FIG. 1 shows in detail a card reader 1 comprising a housing 2 (one part or multiple parts). A connecting plug 3 is provided for signal transmission, carrying signals in both directions. It is also conceivable to provide a connecting plug for the signal input and, separately from that, another connecting plug for the signal output.

A card holder 4 of the type known from the computer field can be seen projecting at least partially out of the housing 2 of the card reader 1. A card 5 in bank-card format for example is in turn fitted into this card holder 4. The design of the card holder 4 and the card 5 as well as their functioning are fundamentally known from pay TV services in the consumer field for example. Only when the card 5 has been fitted correctly into the card holder 4 is it possible for signals passing through the card 5 and the intelligence present in the card holder 4 (decrypting, decoding and the like) to be in a form that can be played back.

FIG. 1 shows that there is a latch 6 that secures the card 5 in its ideal position inside the card holder 4 and thus also inside the housing 2 of the card reader 1. This latch 6 according to FIG. 1 is an elastically deformable and projecting strap that can also be referred to a locking hook.

Figure 2:
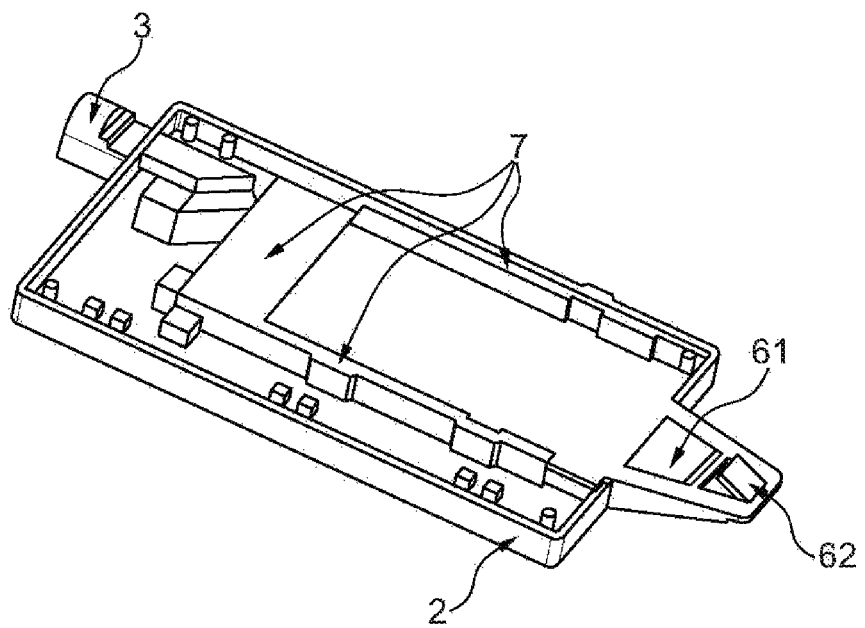
Figure 2:
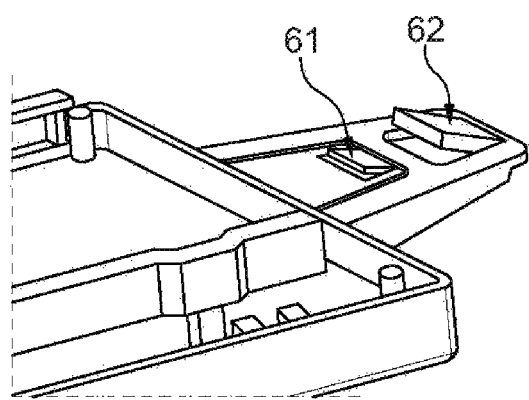
Figure 3:
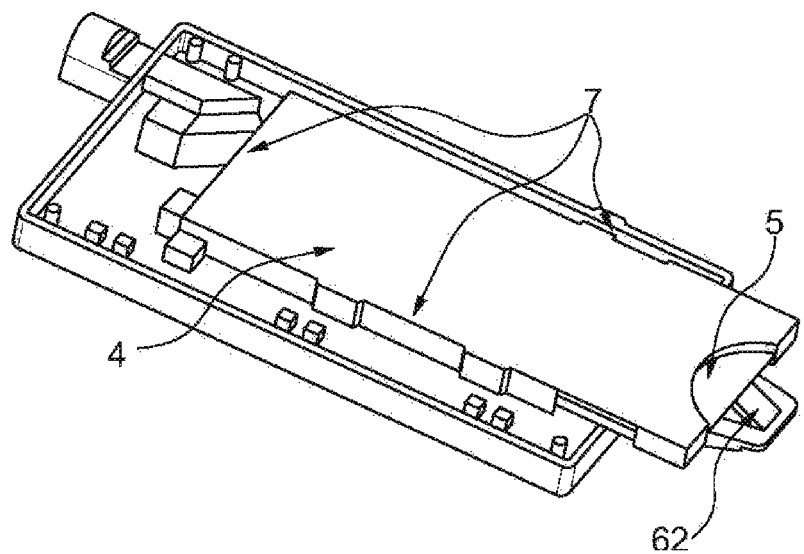
Figure 3:
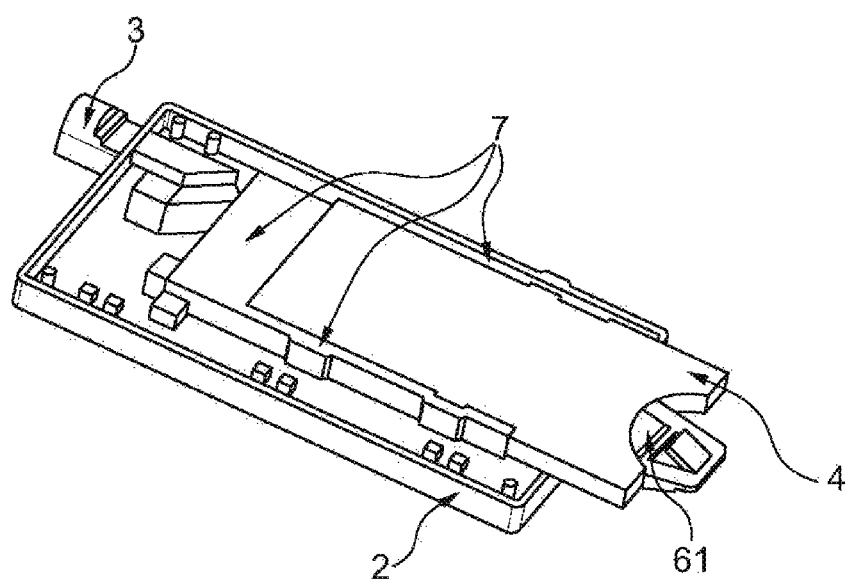

With respect to additional details of the design of the card reader 1, reference is made to FIGS. 2 and 3.

FIGS. 2 and 3 show that the housing 2 of the card reader 1 consists of at least two parts (preferably exactly two parts). These figures show that the latch comprises a first latch formation 61 and a second latch formation 62. These formations are formed in one piece with one part (the bottom shell) of the housing 2. Furthermore, guides 7 provided in the housing 2, in particular on its bottom part, are suitable and designed for engaging the card holder 4 from the outside through a slot in the housing 2 of the card reader 1 in a targeted manner and securing it in its final position. The first and second latch formations 61, 62 are also designed in the form of locking hooks, i.e. elastically deformable and projecting straps.

With reference to FIG. 3, it can be seen that the card holder 4 has been fitted by the guides 7 into the housing 2 that is still open. The top part of the housing 2 of the card reader 1 is omitted here for the sake of illustration of the functioning but would of course be present during final operation of the card reader 1. The view on the left of FIG. 3 shows that the card holder 4 (here without a card 5 at first) has been fitted into the housing 2. Once the card holder has reached its final position inside the housing 2, the first latch formation 61 acts on the card holder 4, so that it is secured permanently in the housing 2 by the first latch formation 61, but in such a way that the card holder can be removed.

Once this has been accomplished, the card 5 is fitted into the card holder 4 that is already inside the housing 2. Once the card 5 has reached its final correct position inside the card holder 4, the second latch formation 62 acts on the card 5, so that the card 5 is secured permanently but removably in the card holder 4 by the two lock formations 61, 62 on the whole, and in turn the card holder 4 is also secured permanently but removably in the housing 2 of the card reader 1, as described above.

Because of the design of the two lock formations 61, 62 according to the embodiment in FIGS. 2 and 3, it is possible that either the card holder 4 remains in the housing 2 of the card reader 1 and only the card 5 can be replaced by another user with another card, for example, or by the same user for receiving different services. Or on the other hand, it is conceivable that the card holder 4 together with the one card 5 may be fitted into the housing 2 of the card reader 1 and, after actuation of the first and second latch formations 61, 62, be replaced together by another card holder 4 holding another a card 5.

For the sake of thoroughness, it should be pointed that the card holder 4 as described above has intelligence (electronics for decrypting and/or decoding the inputted signals). These electronics can be connected to the connecting plug 3 by corresponding connections, so that signals received via an antennas for example, or via a cable can be sent to the card holder 4 by this connecting plug 3 in both directions and decrypted and decoded there and then relayed via the connecting plug 3. However, it is also possible to consider either providing an additional or electronic circuit on a circuit board inside the housing 2 of the card reader 1, on which the insert rails 7 may be provided, so that a corresponding electronic circuit inside the card holder 4 may be omitted. However, it is also conceivable to provide one electronic circuit in the card holder 4 and another electronic circuit inside the housing 2 (preferably on a circuit board inside the housing 2).

LIST OF REFERENCE NUMERALS

1 Card reader
2 Housing
3 Connecting plug
4 Card holder
5 Card
6 Latch
61 First latch formation
62 Second latch formation
7 Guides

The invention claimed is:

1. A card reader comprising:
   a housing;
   a card holder fittable with the housing and into which a card is fittable;
   means on the housing for retaining the card holder in the housing;
   a first latch formation on the housing and that releasably retains the card holder in the housing; and
   a second latch formation on the housing engageable with the card for preventing the card from slipping out of the card holder when the card has been fitted to the card holder and the card holder has been fitted to the housing.

2. The card reader according to claim 1, wherein the means for retaining the card holder in the housing is formed by guides.

3. The card reader according to claims 1, wherein the latch formations are locking hooks.

4. The card reader according to claims 1, wherein the latch formations are unitarily formed with the housing.

5. The card reader according to claims 1, wherein the latch formations are mounted on the housing.

6. The card reader according to claim 1, wherein the latch formations and the housing are at least partially formed as a one-piece injection molded part made of plastic.

* * * * *